3,306,755
ANTI-FOGGING COATING AND NON-FOGGING COATED POLYSTYRENE ARTICLE
Thomas F. Sincock, Simsbury, Lewis F. Bogle, Enfield, and Howard A. Scopp, Suffield, Conn., assignors, by mesne assignments, to Monsanto Company, a corporation of Delaware
No Drawing. Filed Sept. 25, 1962, Ser. No. 226,165
4 Claims. (Cl. 99—171)

This invention relates to anti-fogging compositions for polystyrene articles, and particularly for biaxially oriented polystyrene film or sheeting of the type used for packaging moisture-containing products. The invention also includes biaxially oriented polystyrene film coated with the novel coating composition and packages made wholly or partially from such coated film.

Polystyrene film is normally transparent and is used as a packaging material, or as a window in cartons, for various foods, and particularly for moisture-containing foodstuffs such as vegetables, fruit, fresh meat, bacon, sausages, etc. The untreated polystyrene film, while effectively protecting the contents of the package from outside contamination, is subject to an important disadvantage in that it tends to become fogged with small droplets of water when the temperature of the package drops sufficiently to cause condensation of moisture on the inner surface of the wrapping material. The formation of droplets in such cases is attributable to the hydrophobic surface quality of the wrapping material, and represents a substantial sales disadvantage in that it mars the appearance of the package and prevents the potential purchaser from viewing the contents.

The principal object of this invention is to provide a transparent, non-toxic, flexible, lubricous, tenacious coating composition for rendering the surface of polystyrene articles non-fogging. A more specific object is to provide a coating composition containing nitrocellulose and comprising a solvent system highly effective for dissolving the coating material and suitable for application to biaxially oriented polystyrene without dissolving the latter. Another object is to provide non-fogging transparent polystyrene film or sheet which is coated on at least one of its surfaces with the novel lubricous coating composition and thus to provide a means or method for producing packages made at least partially of polystyrene and capable to remain transparent for long periods of time in a highly humid environment. These and other objects, as well as the scope, nature and utilization of the invention, will become more clearly apparent from the following description and appended claims.

Various coating compositions have been heretofore proposed for the purpose of preventing the fogging of transparent packages. However, particularly in the case of polystyrene film, no truly satisfactory composition of this kind has been heretofore available. For instance, compositions based principally on certain surface active sulfated or sulfonated organic materials have been found fairly effective for reducing the fogging but they have not been widely accepted because, when applied to polystyrene film, they greatly reduce the surface slip of the film and thus create handling problems when the treated film is wound on and unwound from rolls. Also, many such coating compositions do not adhere to the film with the required tenacity, sometimes impair its clarity, etc.

After extensive research, it has now been discovered that satisfactory results can be obtained, and the disadvantages typical of the prior art avoided, by formulating an anti-fogging composition based on a mixture containing essentially a salt of a sulfated fatty alcohol and suitably plasticized nitrocellulose, provided, however, that the composition is applied in the form of a solution employing a carefully selected solvent system that does not attack polystyrene. Thus, while nitrocellulose solutions are commonly made using various mixtures of ethyl acetate and toluene as the solvent, such solutions are generally not suitable for use in the present invention since they attack polystyrene.

The nitrocellulose-containing coating composition of this invention consists of a mixture of four principal classes of non-volatile components in appropriate concentrations which are dissolved in a carefully chosen blend of solvents having a proper balance of boiling points and evaporation rates, as well as ability to dissolve the solid components without dissolving the polystyrene.

Suitable ranges for the non-volatile components, expressed in weight percent based on the total weight of the said components, are as follows: (1) Nitrocellulose from 10 to about 72%, preferably from 30 to 40%; (2) Modifying resin from about 20 to 50%, preferably from 35 to 45%; (3) plasticizer from 0 to about 20%, preferably from about 10 to 15%; and (4) Moisture-spreading surfactant from about 8 to 20%, preferably from about 10 to 15%. A particularly good formula comprises approximately: (1) 40% Nitrocellulose (2) 40% Modifying Resin (3) 10% Ester Plasticizer and (4) 10% Salt of a Sulfated Fatty Alcohol.

The nitrocellulose employed in the coating composition desirably is cellulose nitrate containing about 1.8 to 2.3 nitrate groups per anhydroglucose residue, i.e., a nitrogen content of about 10.9 to about 12.2%, cellulose nitrate having a nitrogen content between about 10.9 and 11.2% being especially preferred. Nitrocellulose, because of its flammable nature, is usually supplied in commerce in an alcohol-wet form, i.e., as a solid containing about 25 to 35 weight percent of ethanol.

The resin used to modify the nitrocellulose may be of a variety of types known in the art, e.g., alkyd type resins such as those made from phthalic anhydride and glycerol. It is preferred to use resins having little or no unsaturation, so as to avoid discoloration. Particularly preferred are the resins made by reacting maleic anhydride and rosin acid (e.g., abietic acid). However, acceptable modification of the nitrocellulose can also be accomplished with a variety of other known types of resins which are capable of forming a transparent, flexible, tenacious composition when admixed with the nitrocellulose, such as coumarone-indene resins, urea-formaldehyde resins, rosin modified hard alkyds, natural resins such as Gum Damar, polyacrylate esters, etc. Of course, the optimum concentration of resin used will depend somewhat on its physical characteristics and the amount of plasticizer employed, if any.

Any plasticizer known in the art for plasticizing nitrocellulose may be employed in the coating composition, such as dibutyl phthalate, dioctyl phthalate, dicyclohexyl phthalate and butyl benzyl phthalate. The corresponding esters of acids such as phosphoric, sebacic, azelaic acid are similarly useful. Epoxidized soya oil and other epoxidized oils are similarly useful. Of course, toxic compounds such as tricresyl phosphate should be avoided if the film product is intended for use in food packaging.

As a surfactant, sulfated fatty alcohols of about 10 to 22 carbon atoms and their neutralization products may be used. Particularly preferred is sodium lauryl sulfate, but other compounds such as sodium decyl sulfate, sodium stearyl sulfate as well as the corresponding ammonium salts and salts of the other alkali metals such as potassium are similarly useful.

The solvent blend used in the instant invention must be one which will dissolve the nitrocellulose and modifying resin employed in the composition but not attack the polystyrene to which the composition is to be applied. Solvent blends consisting essentially of about 50 to 85% methanol and correspondingly at least about 15% of a solvent such as butyl acetate, toluene or ethylene glycol monomethyl ether (hereinafter referred to as "EGME") are required. More particularly, solvent systems consisting essentially of the following components have been found to possess a particularly advantageous combination of selective solvent power and balance of boiling points and evaporation rates:

|  | Broad Range, Weight Percent | Preferred Range, Weight Percent | Example, Weight Percent |
|---|---|---|---|
| Methanol | 50-85 | 78-83 | 81 |
| Butyl Acetate | 0-25 | 3-7 | 7 |
| Toluene | 0-25 | 3-7 | 5 |
| EGME | 0-25 | 7-12 | 8 |

Of course, the solvent system may also comprise a minor amount, e.g., up to 5% or more, of ethanol which is frequently present in commercially available forms of nitrocellulose.

A coating solution containing from 2% to 10% of the earlier named non-volatile constituents may be used in the instant invention, with the optimum concentration of such non-volatiles in the solution being about 4%.

When less than about 2% of the non-volatile are employed in the treating solution, the anti-fogging properties of the product tend to become inadequate if only a single coat of the solution is applied. When the non-volatiles are present in the solution in concentrations greater than about 10%, the coating tends to become hazy and defeats the main object of the invention.

The coating composition may be applied to the polystyrene article by any conventional coating method, such as by rotogravure. The quantity of the coating applied may be such that the dry coating weight is from about 25 to 125 micrograms/sq. in. The optimum dry coating weight has been found to be about 50 micrograms/sq. in.

The use and advantages of the present invention are further illustrated by the following example. It will be understood that in this example, as in the remainder of this specification and claims, proportions of materials are stated on a weight basis unless otherwise indicated.

*Example*

A solvent blend was made up by mixing 820 parts of methanol, 50 parts of butyl acetate, 50 parts toluene and 80 parts EGME.

To 1000 parts of the above solvent were added 21.5 parts of alcohol-wet nitrocellulose (15 parts nitrocellulose and 6.5 parts ethanol), 16.7 parts of "Petrex" acid (a resin formed by reacting maleic anhydride with rosin acid), 5 parts of dibutyl phthalate and 5 parts of sodium lauryl sulfate.

The nitrocellulose employed had the following characteristics:

Percent nitrogen _____ 11.0
Viscosity grade _____seconds__ ½

The "Petrex" modifying resin employed had the following characteristics:

Softening point (Hercules Drop Method), °C _ 45-52
Color _____ Water white
Acid number _____ 515-535
Specific gravity, 25/25 _____ 1.10

The mixture was stirred until a homogeneous solution was obtained.

The resulting solution was then applied by rotogravure onto one side of 0.001 inch thick biaxially oriented polystyrene film at a dry coating weight of 50 micrograms per square inch. Conventional forced hot air drying was employed.

Samples of this coated film were used as window material in commercial bacon cartons and exposed to 24 hour cycles of 40° F. followed by 1 hour at 73° F. Control samples, bacon cartons containing windows of uncoated oriented polystyrene, were also similarly exposed. The controls were heavily fogged after 1 hour at 40° F. while the coated film was not fogged after three such 24 hour cycles.

While only certain embodiments of the invention have been described herein, it will be apparent to those skilled in the art that the principle of the invention may be embodied in various other ways without departing from the spirit or scope thereof. The scope of the invention is particularly pointed out in the appended claims.

We claim:

1. A non-fogging transparent polystyrene film having applied to at least one side thereof a coating in a thickness of about 25 to 125 micrograms per square inch, said coating consisting essentially of about 30-40% nitrocellulose, 35-45% resin formed by reacting maleic anhydride with rosin acids, 10-15% dibutyl phthalate, and 10-15% sodium lauryl sulfate.

2. As an article of manufacture, a moisture-containing foodstuff enclosed in a packaging material comprising a transparent biaxially oriented polystyrene film having applied to at least the inner surface thereof a coating in a thickness of about 25 to 125 micrograms per square inch, said coating consisting essentially of about 30-40% nitrocellulose, 35-45% resin formed by reacting maleic anhydride with rosin acids, 10-15% dibutyl phthalate, and 10-15% sodium lauryl sulfate.

3. A carton for packaging food products which comprises a window of transparent biaxially oriented polystyrene film having applied to at least the inner surface thereof a non-fogging coating in a thickness of about 25 to 125 micrograms per square inch, said coating consisting essentially of about 30-40% nitrocellulose, 35-45% resin formed by reacting maleic anhydride with rosin acids, 10-15% dibutyl phthalate, and 10-15% sodium lauryl sulfate.

4. A non-fogging transparent polystyrene film for packagnig food products, said film having applied to at least one side thereof a coating in a thickness of about 25 to 125 micrograms per square inch, said coating consisting essentially of 30-40% of nitrocellulose, 35-45% of a modifying resin capable of forming a transparent, flexible, tenacious composition when admixed with nitrocellulose and selected from the group consisting essentially of resins made by reacting maleic anhydride and rosin acid, alkyd resins, coumarone-indene resins, urea-formaldehyde resins, gum damar and polyacrylate esters, 10 to 15% of a dialkyl phthalate of 4 to 8 carbon atoms per alkyl group as a plasticizer for the nitrocellulose, and 8 to 20% of an ammonium or alkali metal salt of a sulfated fatty alcohol of about 10 to 22 carbon atoms per molecule as a moisture-spreading surfactant.

References Cited by the Examiner

UNITED STATES PATENTS

| 1,644,420 | 10/1927 | Davidson | 160—195 |
| 2,101,066 | 12/1937 | Wollabaugh | 260—16 |
| 2,108,001 | 2/1938 | Bowlby | 160—195 |
| 2,379,974 | 7/1945 | Little | 160—173 |
| 2,416,103 | 2/1947 | Lampton et al. | 160—13 |
| 2,571,340 | 10/1951 | Carson | 99—171 |
| 2,824,019 | 2/1958 | Sapper | 117—138.8 |
| 2,872,318 | 2/1959 | Starck | 117—138.8 |
| 3,010,838 | 11/1961 | Uber | 106—186 |

ALEXANDER H. BRODMERKEL, *Primary Examiner.*

LEON J. BERCOVITZ, *Examiner.*

C. A. WENDEL, L. B. HAYES, *Assistant Examiners.*